US009746659B2

(12) United States Patent
Doi et al.

(10) Patent No.: US 9,746,659 B2
(45) Date of Patent: Aug. 29, 2017

(54) SURGICAL MICROSCOPE SYSTEM

(71) Applicant: MITAKA KOHKI CO., LTD., Tokyo (JP)

(72) Inventors: Masao Doi, Tokyo (JP); Katsuyuki Nakamura, Tokyo (JP)

(73) Assignee: MITAKA KOHKI CO., LTD., Tokyo (JP)

( * ) Notice: Subject to any disclaimer, the term of this patent is extended or adjusted under 35 U.S.C. 154(b) by 283 days.

(21) Appl. No.: 14/689,418

(22) Filed: Apr. 17, 2015

(65) Prior Publication Data

US 2015/0301326 A1 Oct. 22, 2015

(30) Foreign Application Priority Data

Apr. 21, 2014 (JP) ................. 2014-087172

(51) Int. Cl.
*G02B 21/22* (2006.01)
*G02B 21/36* (2006.01)
*G02B 21/00* (2006.01)
*H04N 5/225* (2006.01)

(52) U.S. Cl.
CPC ....... *G02B 21/362* (2013.01); *G02B 21/0012* (2013.01); *G02B 21/22* (2013.01); *G02B 21/367* (2013.01); *H04N 5/2252* (2013.01)

(58) Field of Classification Search
CPC .. G02B 21/0012; G02B 21/22; G02B 21/362; G02B 21/367; H04N 5/2252
USPC ........................................... 348/45
See application file for complete search history.

(56) References Cited

U.S. PATENT DOCUMENTS

| 4,806,776 | A | * | 2/1989 | Kley | G02F 1/134309 250/225 |
| 5,835,264 | A | * | 11/1998 | Tandler | G02B 21/22 348/49 |
| 5,867,210 | A | * | 2/1999 | Rod | H04N 13/0029 348/51 |
| 6,317,260 | B1 | * | 11/2001 | Ito | G02B 21/22 359/377 |

(Continued)

FOREIGN PATENT DOCUMENTS

| CN | 101776198 | 7/2010 |
| CN | 202631839 U | 12/2012 |

(Continued)

OTHER PUBLICATIONS

Office Action issued in China Counterpart Patent Appl. No. 201510189756.X, dated Dec. 28, 2016 , along with an English translation thereof.

(Continued)

*Primary Examiner* — Shan Elahi
(74) *Attorney, Agent, or Firm* — Greenblum & Bernstein, P.L.C.

(57) ABSTRACT

A surgical microscope system includes a camera that is rotatable around a first rotation axis and a second rotation axis, the rotation axes being orthogonal to each other, so that a photographing direction of the camera is changeable at a given position. The first rotation axis is inclined with respect to a vertical axis, and therefore, a lower end of a first member is able to be set at a height that does not interfere with the photographing direction when the camera is horizontally oriented.

10 Claims, 4 Drawing Sheets

(56) References Cited

U.S. PATENT DOCUMENTS

| | | | | |
|---|---|---|---|---|
| 6,398,721 | B1 * | 6/2002 | Nakamura | G02B 7/001 359/385 |
| 6,882,473 | B2 * | 4/2005 | Geier | G02B 21/22 348/E13.007 |
| 6,899,307 | B2 * | 5/2005 | Strauss | A61B 90/25 248/123.11 |
| 7,193,773 | B2 * | 3/2007 | Haisch | G02B 21/22 348/E13.009 |
| 7,258,668 | B2 * | 8/2007 | Hirooka | A61B 8/0841 600/437 |
| 7,506,981 | B2 * | 3/2009 | Kim | A61B 3/132 351/206 |
| 7,633,676 | B2 * | 12/2009 | Brunner | G02B 21/0012 359/369 |
| 8,270,073 | B2 | 9/2012 | Nakamura et al. | |
| 8,786,946 | B2 * | 7/2014 | Nakamura | G02B 21/0012 359/363 |
| 8,885,250 | B2 * | 11/2014 | Doi | A61B 19/5223 359/384 |
| 2004/0036962 | A1 | 2/2004 | Brunner et al. | |
| 2006/0135866 | A1 * | 6/2006 | Namii | H04N 13/0239 600/407 |
| 2011/0032335 | A1 * | 2/2011 | Sander | G02B 21/025 348/46 |
| 2013/0041221 | A1 * | 2/2013 | McDowall | A61B 1/00096 600/111 |

FOREIGN PATENT DOCUMENTS

| | | |
|---|---|---|
| CN | 103156572 A | 6/2013 |
| CN | 203217161 U | 9/2013 |
| EP | 2700374 A1 | 2/2014 |
| JP | H11153756 A | 6/1999 |
| JP | 5396307 B2 | 1/2014 |

OTHER PUBLICATIONS

"YanBiao YizhiXue", Jan. 31, 2008, pp. 272-275.

* cited by examiner

SURGICAL MICROSCOPE SYSTEM

BACKGROUND OF THE INVENTION

1. Field of the Invention

The present invention relates to a surgical microscope system.

2. Description of Related Art

Some neurosurgical or surgical operations are conducted, instead of by observing an operative field through an eyepiece of a surgical microscope, by taking electronic images of the operative field with a camera supported at a certain height and by observing the electronic images on an electronic image display. The electronic-image-taking and displaying of an operative field may be two-dimensional or three-dimensional. In a case of three-dimensional fashion, an operator must wear exclusive glasses to see three-dimensional images. Seeing two- or three-dimensional images of an operative field on a display releases the operator from putting his or her eyes on the eyepiece of a surgical microscope, thereby expanding the operator's mobility. In addition, it allows not only the operator but also assistants to observe the two- or three-dimensional images on a display.

The camera used for this purpose is supported at a front end of a support arm of a stand so that the camera is freely set at a midair position. A related art disclosed in U.S. Pat. No. 7,633,676 supports a camera with a plurality of long auxiliary arms so that the camera may be oriented in an optional photographing direction at an optional midair position.

SUMMARY OF THE INVENTION

According to the related art, the long auxiliary arms that support the camera are arranged at a front end of a support arm of a stand, and therefore, a supporting rigidity of the camera is low and the camera is unstable and tends to easily shake. To improve the supporting rigidity of the camera, the auxiliary arms must be shortened to bring the camera closer to the front end of the support arm of the stand. This, however, results in limiting a rotational range of the camera. For example, the auxiliary arms block the photographing direction of the camera when the camera is horizontally oriented.

In consideration of the problems of the related art, the present invention provides a surgical microscope system capable of supporting a camera in the vicinity of a front end of a stand without blocking the photographing direction of the camera.

According to an aspect of the present invention, the surgical microscope system includes a camera for taking electronic images of an operative field, the camera being supported with an auxiliary arm under a front member of a support arm horizontally extending from a stand and an electronic image display for displaying the electronic images taken by the camera. The auxiliary arm has a first member that extends downward from the front member and a second member attached to a lower end of the first member, an upper end of the second member being attached to the lower end of the first member so that the second member is able to rotate around a first rotation axis that is inclined with respect to a vertical axis. A lower end of the second member supports the camera so that the camera is able to rotate around a second rotation axis that is horizontal and is orthogonal to the first rotation axis. The lower end of the first member is at a height that does not interfere with a photographing direction of the camera when the camera is horizontally oriented.

DESCRIPTION OF PREFERRED EMBODIMENT

Figure 1:
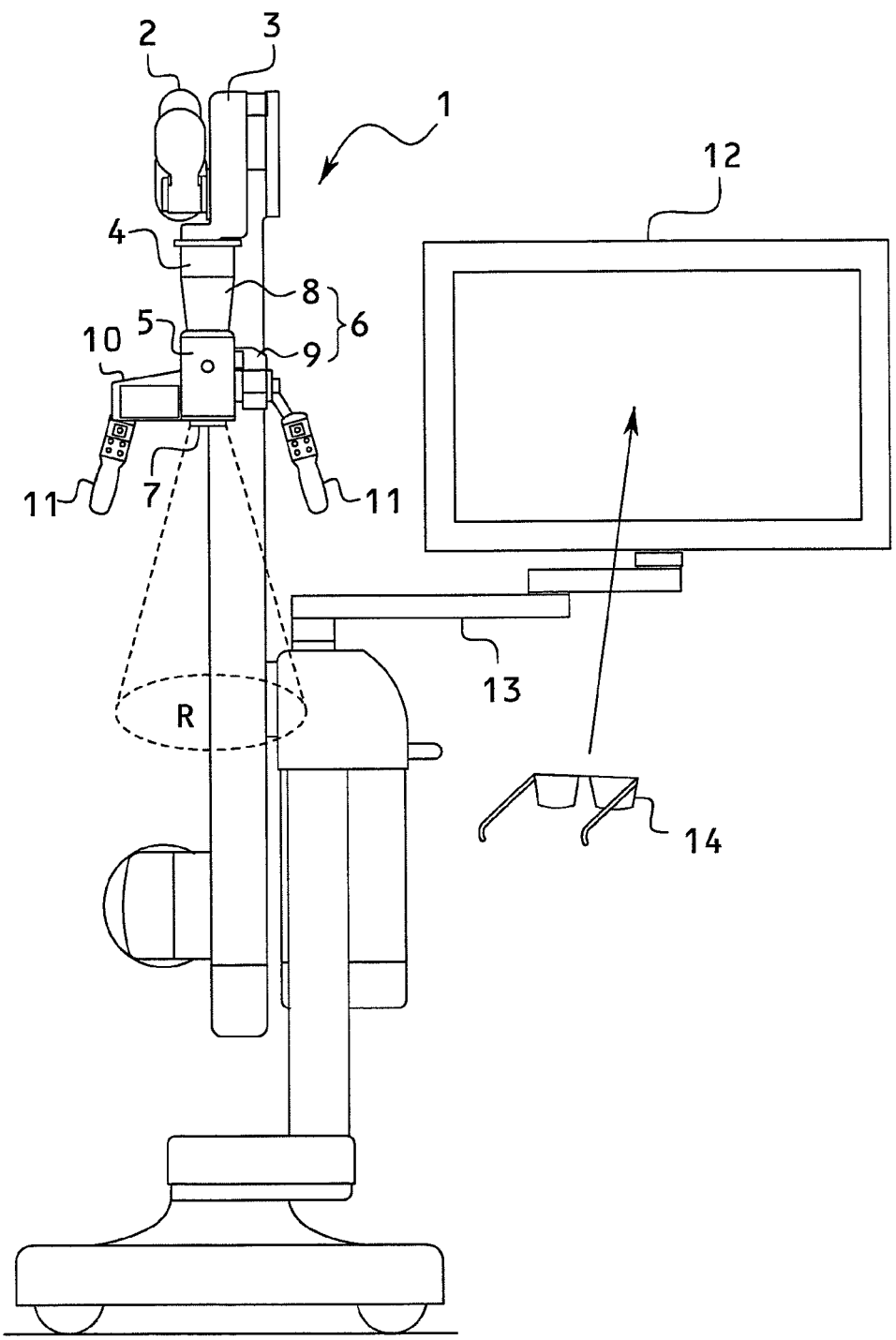
FIG. 1 is a front view illustrating a surgical microscope system according to an embodiment of the present invention.
Figure 2:
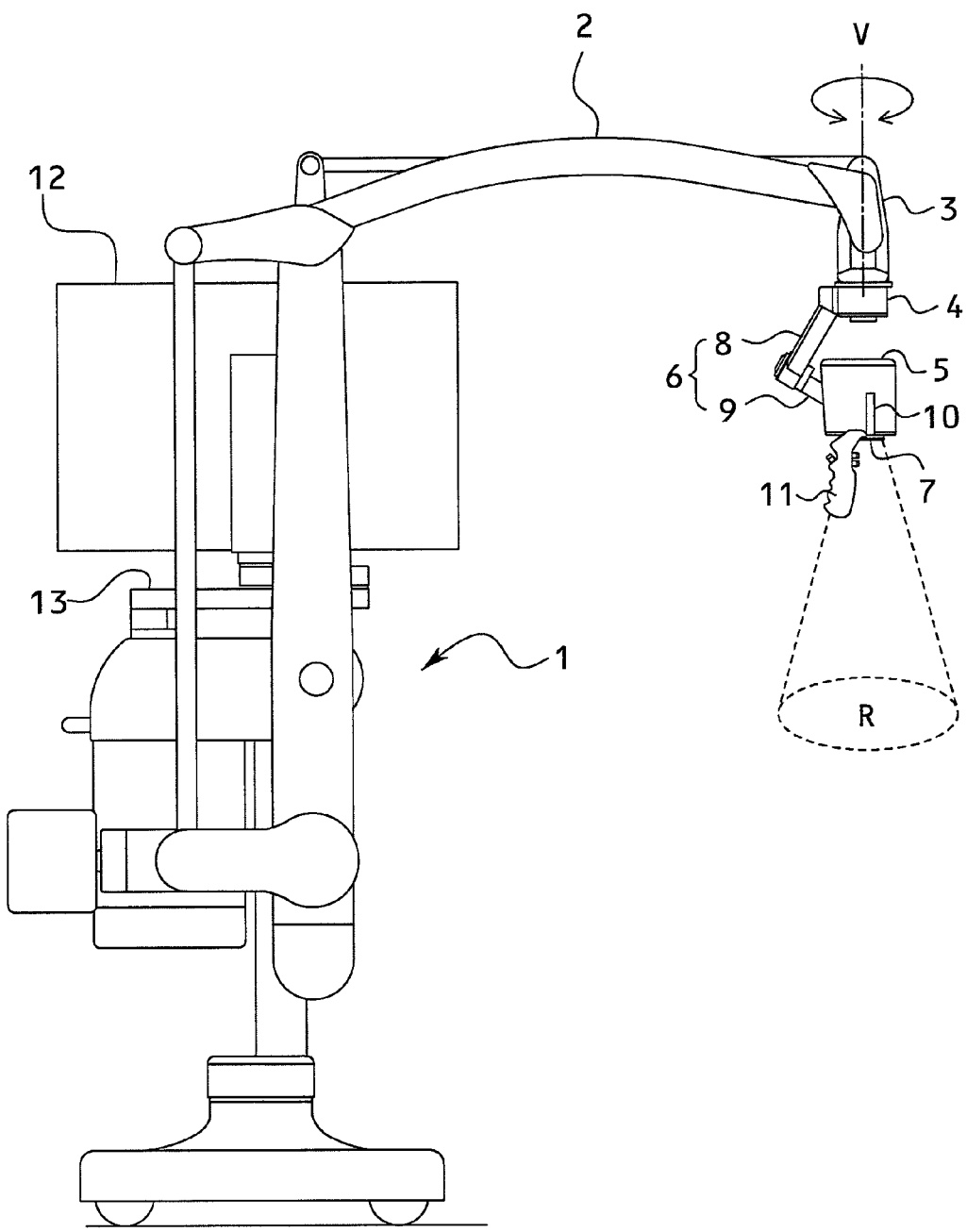
FIG. 2 is a side view illustrating the surgical microscope system.
Figure 3:
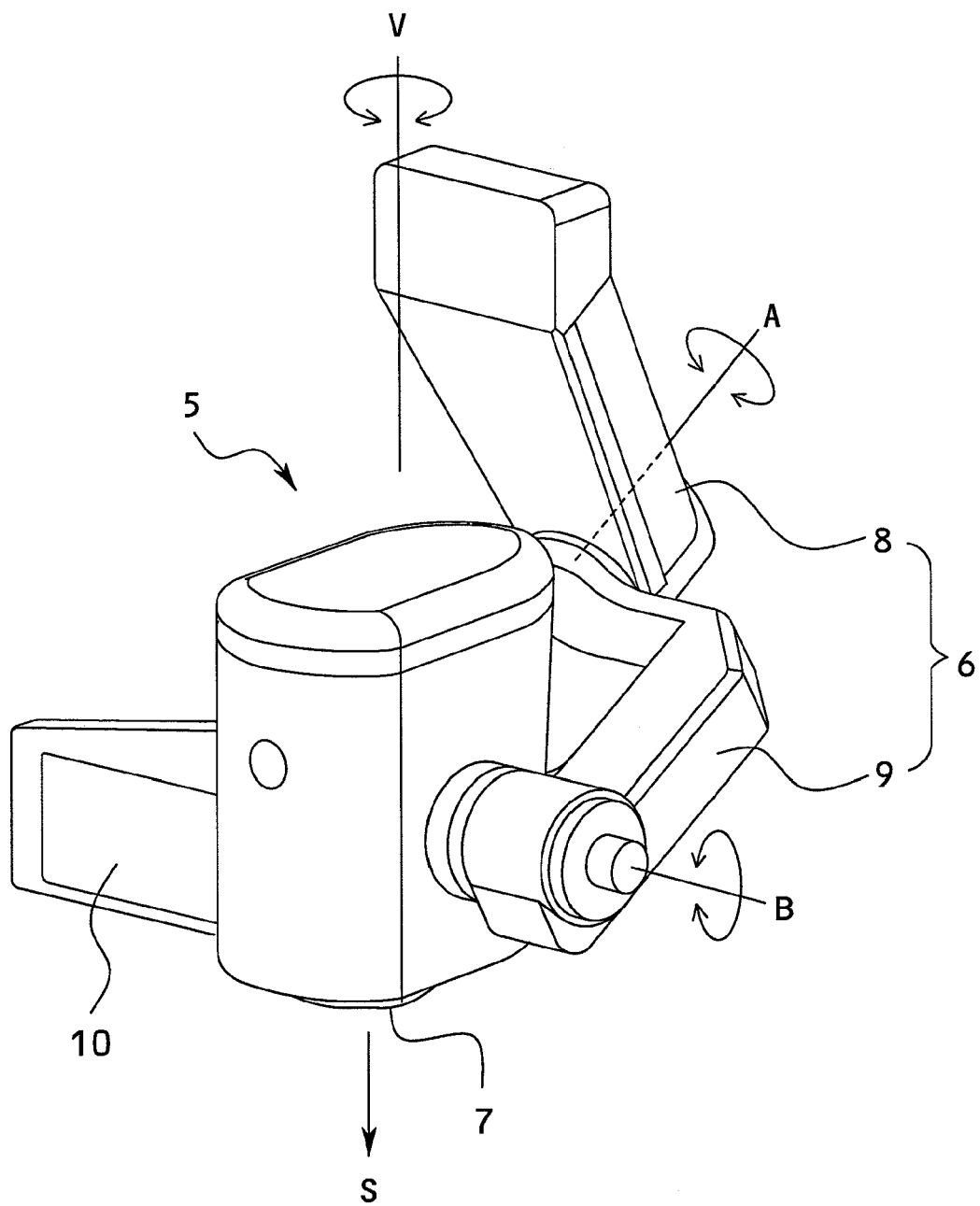
FIG. 3 is a perspective view illustrating a state of supporting a camera in the surgical microscope system.

A surgical microscope system according to an embodiment of the present invention will be explained in detail with reference to FIGS. 1 to 5.

A stand 1 has a horizontally extending support arm 2. The support arm 2 has a parallel linkage structure to keep a front link 3 vertical when the support arm 2 is moved up and down. The front link 3 has a virtual vertical axis V that passes through a vertical link element (front element) of the parallel linkage structure of the support arm 2. A lower end of the front link 3 has a front member 4 that is rotatable relative to the vertical link element around the vertical axis V.

A camera 5 is supported by and under the front member 4 through an auxiliary arm 6. Arranged at a lower end of the camera 5 is an objective lens 7 that stereoscopically takes optical images having binocular parallax of an operative field R.

The auxiliary arm 6 includes a first member 8 and a second member 9. An upper end of the first member 8 is fixed to a side face of the front member 4 and the first member 8 hangs down from the front member 4 in such a way to incline in a direction separating away from the vertical axis V that passes through the center of the front member 4. The second member 9 has an L-shape and an upper end of the second member 9 is supported at a lower end of the first member 8 so that the second member 9 is rotatable around a first rotation axis A. Since the first member 8 is inclined, the first rotation axis A on the first member 8 is inclined in an oblique downward direction relative to the vertical axis V.

A lower end of the second member 9 supports the camera 5 at a side face thereof so that the camera 5 may rotate around a second rotation axis B that is horizontal. The first rotation axis A, second rotation axis B, and vertical axis V cross each other at one point that substantially corresponds to the barycenter of the camera 5. Namely, the position of the barycenter of the camera 5 does not change as the camera 5 is turned around any one of the first rotation axis A, second rotation axis B, and vertical axis V. This means that the camera 5 is supported by a gimbal structure involving the three axes A, B, and V, and therefore, the camera 5 is able to arbitrarily change the orientation thereof at the position.

A side face (second face) of the camera 5 opposite to the side face (first face) that is supported with the second member 9 is provided with a liquid-crystal control panel 10. The control panel 10 protrudes from the second face of the camera 5 and is used when adjusting the sensitivity and the like of the camera 5. The control panel 10 is arranged opposite to the second member 9, and therefore, the visibility of the control panel 10 is not disturbed by interference of the second member 9.

A lower end of the second member 9 and a rear side face of the control panel 10 are provided with handles 11, respectively. An operator grasps the handles 11 to move the stand 1 to set the camera 5 at an optional midair position, and at the midair position, the operator changes and determines the orientation of the camera 5 with the handles 11.

The stand 1 has a folding arm 13 that supports an electronic image display 12. The display 12 is typically a liquid-crystal panel and is able to receive image signals from the camera 5, combine the image signals real time into a pair of electronic images having binocular parallax, and display the electronic images. The images displayed on the display 12 are three-dimensionally observed by an operating surgeon and assistants who each wears exclusive glasses 14.

Figure 4:
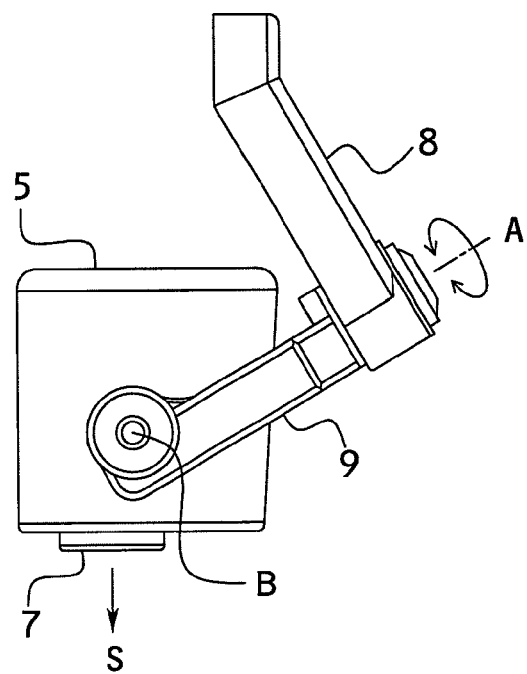
FIG. 4 is a side view illustrating the camera supported in a vertical state in the surgical microscope system.
Figure 5:
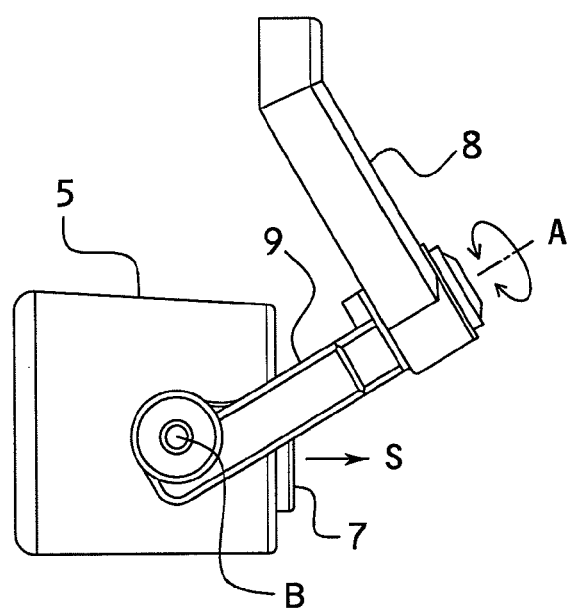
FIG. 5 is a side view illustrating the camera supported in a horizontal state in the surgical microscope system.

The camera 5 is normally supported in a vertical state in which an optical axis of the objective lens 7 of the camera 5 is vertical as illustrated in FIG. 4. In this case, a photographing direction S of the camera 5 is downward and the operator observes the operative field R that is under the camera 5. Depending on an operation to carry out, the camera 5, i.e., the optical axis of the objective lens 7 may be horizontally set as illustrated in FIG. 5. In this case, the photographing direction S of the camera 5 is sideward and the operator observes the operative field R that is lateral to the camera 5. Even in this case, the oblique (not horizontal) first rotation axis A keeps the lower end of the first member 8 higher than the camera 5, i.e., the second rotation axis B. There is nothing, therefore, to block the view field of the objective lens 7 of the camera 5 in the photographing direction S. Namely, the lower end of the first member 8 never interferes with the photographing direction S of the camera 5. This configuration allows the auxiliary arm 6 to be compact and the camera 5 to be supported at a position closer to a front end of the stand 1. As the camera 5 is supported closer to the stand 1, the camera 5 becomes more stable to realize high-magnification and high-resolution photographing.

The electronic image display 12 may be not only the liquid-crystal panel but also a stereo viewer, which has a casing, a pair of left and right display panels to display electronic images, and a pair of eyepieces to allow a viewer to stereoscopically observe the displayed electronic images. It is not always necessary to photograph and display three-dimensional images. Two-dimensional images may be sufficient depending on an operation to carry out.

In this way, the surgical microscope system according to the present invention includes the camera 5 that is rotatable around the first and second rotation axes A and B that are orthogonal to each other, so that the photographing direction S of the camera 5 may optionally be changed at a given midair position. The first rotation axis A is inclined with respect to the vertical axis V, and therefore, a lower end of the first member 8 is kept at a height that never interferes with the photographing direction S of the camera 5 when the camera 5 is set in a horizontal state. Since the photographing direction S of the camera 5 is not blocked by the auxiliary arm 6, the camera 5 is able to be supported at a position closer to a front end of the stand 1 so as to secure the stability of the camera 5.

According to the present invention, the control panel 10 is arranged on a side face of the camera 5 opposite to a side face of the camera 5 to which the second member 9 is attached. Accordingly, the second member 9 never interferes with the visibility of the control panel 10.

According to the present invention, the camera 5 and electronic image display 12 realize three-dimensional observation, and therefore, an operating surgeon is able to stereoscopically grasp the state of an operative field.

According to the present invention, images displayed on the electronic image display 12 are stereoscopically observable through the exclusive glasses 14. By respectively wearing the glasses 14, not only the operating surgeon but also assistants are able to stereoscopically observe the images displayed on the display 12.

This patent application claims the benefit of priority under 35 U.S.C. 119(a) to Japanese Patent Application No. 2014-087172 filed on Apr. 21, 2014 whose disclosed contents are incorporated by reference herein.

What is claimed is:

1. A surgical microscope system comprising a camera for taking electronic images of an operative field, the camera being supported with an auxiliary arm under a front arm of a support arm horizontally extending from a stand and an electronic image display for displaying the electronic images taken by the camera, wherein:
   the auxiliary arm has:
      a first arm that extends downwardly from the front arm in a direction inclined with respect to and extending away from a vertical axis of the front arm; and
      a second arm attached to a lower end of the first arm, an upper end of the second arm being attached to the lower end of the first arm so that the second arm is able to rotate around a first rotation axis that is inclined with respect to the vertical axis;
   a lower end of the second arm supports the camera so that the camera is able to rotate around a second rotation axis that is horizontal and is orthogonal to the first rotation axis so that the camera is supported by a gimbal structure based upon the vertical axis, the first axis and the second axis to change a position of the camera; and
   the lower end of the first arm is at a height that does not interfere with a photographing direction of the camera when the camera is horizontally oriented.

2. The surgical microscope system of claim 1, wherein a control panel is integrally arranged on a side face of the camera opposite to a side face of the camera that is supported by the second arm.

3. The surgical microscope system of claim 1, wherein the camera takes a pair of electronic images having binocular parallax and the electronic image display allows the electronic images to be stereoscopically observed.

4. The surgical microscope system of claim 3, wherein the electronic image display combines the pair of electronic images having binocular parallax and displays the combined images so that the displayed images are stereoscopically observed through glasses.

5. The surgical microscope system according to claim 1, a front link extending along the vertical axis between the support arm and the auxiliary arm.

6. The surgical microscope system according to claim 5, a lowermost end of the front link including said front arm mounted for rotation about the vertical axis.

7. The surgical microscope system according to claim 1, the camera being rotatable about the second rotation axis between a position in which a lens of the camera is vertically downwardly oriented and a position in which the lens of the camera is horizontally oriented.

8. The surgical microscope system according to claim 1, the second arm comprising an L-shaped arm, a first end of said second arm pivots about the first rotational axis and the camera pivots about the second rotational axis at a second end of the second arm.

9. The surgical microscope system according to claim 1, a lower end of the second arm includes a handle for adjustment of the camera.

10. The surgical microscope system according to claim 1, further comprising an image display supported by the support arm via a folding arm.

* * * * *